US010166885B2

(12) United States Patent
Voyer (10) Patent No.: US 10,166,885 B2
(45) Date of Patent: Jan. 1, 2019

(54) METHOD AND DEVICE FOR CONTROLLING VOLTAGE OF CATENARY SUPPLYING ELECTRIC POWER TO ROLLING STOCKS

(71) Applicant: MITSUBISHI ELECTRIC CORPORATION, Tokyo (JP)

(72) Inventor: Nicolas Voyer, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 286 days.

(21) Appl. No.: 15/100,958

(22) PCT Filed: Jan. 16, 2015

(86) PCT No.: PCT/JP2015/051745
§ 371 (c)(1),
(2) Date: Jun. 1, 2016

(87) PCT Pub. No.: WO2015/111677
PCT Pub. Date: Jul. 30, 2015

(65) Prior Publication Data
US 2016/0297323 A1     Oct. 13, 2016

(30) Foreign Application Priority Data

Jan. 23, 2014  (EP) ..................... 14152304

(51) Int. Cl.
*B60L 7/18*     (2006.01)
*B60M 3/02*     (2006.01)
(Continued)

(52) U.S. Cl.
CPC ................ *B60M 3/02* (2013.01); *B60L 7/18* (2013.01); *B60M 3/06* (2013.01); *B61L 27/0077* (2013.01);
(Continued)

(58) Field of Classification Search
CPC ......... B60L 3/06; B60L 27/0027; B60M 3/02; B60M 3/06
See application file for complete search history.

(56) References Cited

U.S. PATENT DOCUMENTS 5,351,775 A * 10/1994 Johnston .................. B60K 6/46
                                              180/2.1
6,988,591 B2 * 1/2006 Uranaka ................. E21C 41/26
                                              187/247
(Continued)

FOREIGN PATENT DOCUMENTS

DE    10 2008 020 981 A1    10/2009
WO    WO 2012/153755 A1    11/2012

*Primary Examiner* — Jason C Smith
(74) *Attorney, Agent, or Firm* — Birch, Stewart, Kolasch & Birch, LLP (57) ABSTRACT

The present invention concerns a method and a device for controlling the voltage of a catenary supplying electric power to rolling stocks. A first rolling stock: —detects a traction command or a regeneration command of a second rolling stock in the neighborhood of first rolling stock, —increases the electric power supplied by the first rolling stock to the motor drive of the first rolling stock when a regeneration command of the second rolling stock is detected, —decreases the electric power supplied by the first rolling stock to the motor drive of the first rolling stock when a traction command of the second rolling stock is detected.

8 Claims, 6 Drawing Sheets

(51) Int. Cl.
    *B60M 3/06*        (2006.01)
    *B61L 27/00*       (2006.01)
(52) U.S. Cl.
    CPC ....... *B60L 2200/26* (2013.01); *B60L 2240/12* (2013.01)

(56) References Cited

U.S. PATENT DOCUMENTS

| | | | | |
|---|---|---|---|---|
| 8,151,955 | B2* | 4/2012 | Aubigny | B60L 3/00 191/2 |
| 8,583,303 | B2* | 11/2013 | Bastien | E21F 13/00 701/22 |
| 8,893,830 | B2* | 11/2014 | Ruth | B60L 5/36 180/2.1 |
| 2011/0094841 | A1* | 4/2011 | Mazumdar | B60L 7/10 191/33 R |
| 2014/0032006 | A1* | 1/2014 | Tojima | B60M 3/06 700/295 |
| 2016/0297323 | A1* | 10/2016 | Voyer | B61L 27/0077 |

* cited by examiner

METHOD AND DEVICE FOR CONTROLLING VOLTAGE OF CATENARY SUPPLYING ELECTRIC POWER TO ROLLING STOCKS

The present invention relates generally to a method and a device for controlling the voltage of a catenary supplying electric power to rolling stocks.

An electrified Railway, Tram or Metropolitan system is connected to Public grid via substations. Substations convert electric power from/to the Public grid to/from a catenary. The catenary conveys electric power to/from pantographs of rolling stocks.

Recovery of braking energy is key to reduce energy consumption of railway systems.

Rolling stocks equipped with electric motor drives and pantograph can benefit from electromagnetic brake and can convert braking power into electric power. This power can then be fed to the catenary system and be consumed by surrounding rolling stocks or might be fed back to the grid by surrounding substations.

Due to voltage drop in the catenary, the catenary voltage increases in the vicinity of the rolling stock when the rolling stock injects regenerative power on the catenary. To avoid overvoltage, the rolling stocks have to implement current squeezing. When the voltage gets too high, part of power regenerated by the motor drive is fed to local rheostat, and only a portion of regenerated power is injected to the catenary. As a result, a significant part of regenerative power is lost as heat dissipated in rheostat during braking.

Current squeezing is also essential to consume the excess of braking powers compared to consumption powers in the line. The problem is very severe in case the substations can't feed power back to the grid. Most DC Railway, Tram or Metropolitan systems are not equipped with reversible substations, because Grid is not designed to cope with massive injection of current from railway systems. Such injection could cause instability to the Grid operation and is forbidden by regulation in most countries.

For electrified railway systems equipped with non-reversible substations, without on-board or wayside storage systems, excess braking power consumed in rheostat due to squeezing can represent high losses, such as 30% of total power consumption of the line.

FIG. 1 represent the speed, electric power consumption and catenary voltage of two neighboring rolling stocks in a railway system according to prior art.

The curves in bold are related to a first rolling stock A, the other curves are related to a second rolling stock B.

Figure 1A:
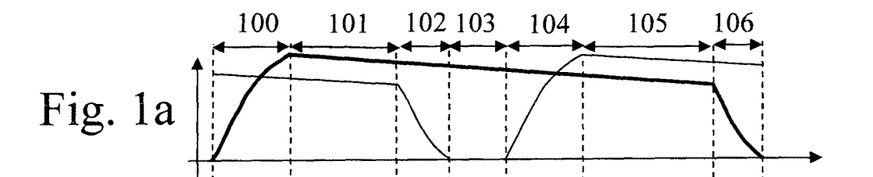
FIG. 1 represent the speed, electric power consumption and catenary voltage of two neighboring rolling stocks in a railway system in which the present invention is not implemented.

FIG. 1a represents the speed of two neighboring rolling stocks.

The horizontal axis of FIG. 1a represents the time.

The vertical axis of FIG. 1a represents the speed of rolling stocks.

During the time period noted 100, the first rolling stock A accelerates, the speed of the rolling stock A increases under action of the motor drive of rolling stock A, which consumes electric power delivered by the catenary.

During the time periods noted 101, 102, 103, 104 and 105, the first rolling stock A is coasting, the speed of the rolling stock A slowly decreases, under the resistance action of the contact between rail/road and the wheels of the rolling stock A, as well as action of the penetration of the rolling stock A in air.

During the time period noted 106, the first rolling stock A decelerates, the speed of the rolling stock A decreases under action of electromagnetic brake of the motor drive of the rolling stock A, which regenerates electric power.

During the time periods noted 100 and 101, the second rolling stock B is coasting, the speed of the rolling stock B slowly decreases, under the resistance action of the contact between rail/road and the wheels of the rolling stock B, as well as action of penetration of the rolling stock B in air.

During the time period noted 102, the second rolling stock B decelerates, the speed of the rolling stock B decreases under the action of electromagnetic brake of motor drive of the rolling stock B, which regenerates electric power.

During the time period noted 103, the second rolling stock B is stopped.

During the time period noted 104, the second rolling stock B accelerates, the speed of the rolling stock B increases under the action of the motor drive of the rolling stock B, which consumes electric power delivered by the catenary.

During the time periods noted 105 and 106, the second rolling stock B is coasting, the electric power consumption of the rolling stock B slowly decreases.

Figure 1B:
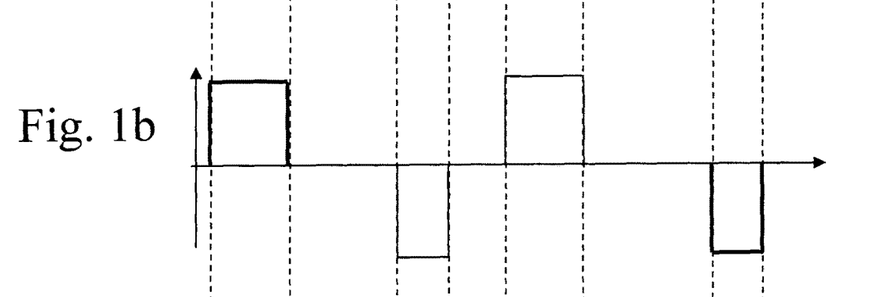

FIG. 1b represents the traction power of two neighboring rolling stocks.

During the time period 100, the traction power of the rolling stock A is high as the rolling stock A accelerates.

During the time period 102, the traction power of the rolling stock B is negative as the rolling stock B decelerates.

During the time period 104, the traction power of the rolling stock B is high as the rolling stock B accelerates.

During the time period 106, the traction power of the rolling stock A is negative as the rolling stock A decelerates.

Figure 1C:
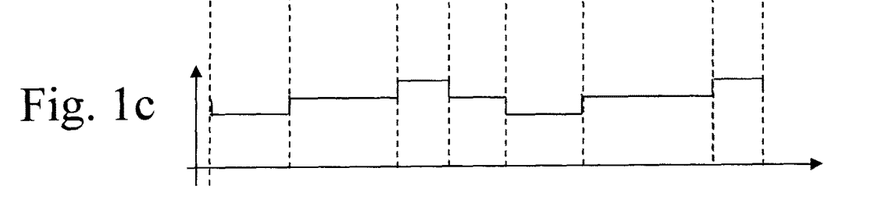

FIG. 1c represents variations due to acceleration and electric power regenerating during braking of catenary voltage measured at pantograph of rolling stock A.

The horizontal axis of FIG. 1c represents the time.

The vertical axis of FIG. 1c represents the catenary voltage measured at pantograph of rolling stock A.

In the time period 100, the catenary voltage is decreased as the rolling stock A accelerates and consumes electric power delivered by the catenary.

In the time period 101, the catenary voltage is stable as the rolling stocks A and B are coasting and do not consume nor regenerate electric power from/to catenary.

In the time period 102, the catenary voltage is increased as the rolling stock B decelerates and injects regenerative power to catenary. When the catenary voltage of the pantograph of the rolling stock B gets higher than a predefined value, the rolling stock B consumes part of the regenerated power in its rheostat.

In the time period 103, the catenary voltage is stable as the rolling stock A is coasting and the rolling stock B is stopped.

In the time period 104, the catenary voltage of the pantograph of the rolling stock B is decreased as the rolling stock B accelerates and consumes electric power delivered by the catenary. As the rolling stock A is in the vicinity of the rolling stock B, the catenary voltage of the pantograph of the rolling stock A also decreases.

In the time period 105, the catenary voltage is stable as the rolling stocks A and B are coasting.

In the time period 106, the catenary voltage is increased as the rolling stock A decelerates and injects regenerative power to catenary. When the catenary voltage of the pantograph of the rolling stock A gets higher than a predefined value, the rolling stock A consumes part of regenerated power in its rheostat.

The present invention aims at reducing the level of rheostatic losses in electrified railway systems and to maintain a stable catenary voltage.

To that end, the present invention concerns a method for controlling the voltage of a catenary supplying electric power to rolling each rolling stock comprising a motor drive, characterized in that the method comprises the steps executed by a first rolling stock of:

detecting a traction command or a regeneration command of a second rolling stock in the neighborhood of first rolling stock,     increasing the electric power supplied by the first rolling stock to the motor drive of the first rolling stock when a regeneration command of the second rolling stock is detected,     decreasing the electric power supplied by the first rolling stock to the motor drive of the first rolling stock when a traction command of the second rolling stock is detected.

The present invention concerns also a device for controlling the voltage of a catenary supplying electric power to rolling stocks, each rolling stock comprising a motor drive, characterized in that the device is included in a first rolling stock and comprises:

means for detecting a traction command or a regeneration command of a second rolling stock in the neighborhood of first rolling stock,     means for increasing the electric power supplied by the first rolling stock to the motor drive of the first rolling stock when a regeneration command of the second rolling stock is detected,     means for decreasing the electric power supplied by the first rolling stock to the motor drive of the first rolling stock when a traction command of the second rolling stock is detected.

Thus, when the second rolling stock commands a regeneration, higher part of regenerated power is consumed by the first rolling stock. As a result, the voltage of catenary at pantograph of the first rolling stock is decreased and the catenary voltage is better stabilised. As a result, the second rolling stock reduces the level of current squeezing, and less regeneration power is burnt in rheostat of the second rolling stock.

Furthermore, when the second rolling stock commands a traction, the power consumed by the first rolling stock is reduced. As a result, the voltage of catenary at pantograph of the first rolling stock is increased and the catenary voltage is better stabilised. As a result, the second rolling stock can consume higher traction power.

According to a particular feature, the increase or the decrease of the electric power supplied by the first rolling stock to the motor drive of the first rolling stock is performed if the first rolling stock is in a coasting mode.

Thus, the present invention avoids that if the first rolling stock is in acceleration mode, the first rolling stock does not exceed the speed limit when the catenary voltage increases. Similarly, the present invention avoids that if the first rolling stock is braking, the first rolling stock does not make short stop when voltage gets low.

According to a particular feature, the coasting mode is determined according to a profile of the first rolling stock.

Thus, as the running profile indicates time and position at which the first rolling stock is supposed to be in coasting mode, the first rolling stock can easily determine when it has to operate in coasting mode from either time or position.

According to a particular feature, the step of detecting a traction command or a regeneration command further comprises steps of     monitoring the voltage on the catenary,     detecting a traction command when the monitored voltage is lower than a first threshold,     detecting a regeneration command when the monitored voltage is higher than a second threshold.

Thus, as the catenary voltage instantaneously decreases upon consumption of power by the second rolling stock and instantaneously increases upon injection of regenerated power by the second rolling stock, the first rolling stock can instantaneously detects a traction command or a regeneration command from the second rolling stock without means for communicating with the second rolling stock.

According to a particular feature, the traction command or the regeneration command is detected by receiving a message from a dispatcher.

Thus, the dispatcher can indicate to rolling stocks located quite away from the second rolling stock to contribute to a stabilisation of voltage fluctuations resulting from power consumption/regeneration by the second rolling stock. A higher number of first rolling stocks can consume a higher portion of excess brake energy, leading to further reduction of rheostatic losses at the second rolling stock.

According to a particular feature, the method comprises further step of transferring a message to the dispatcher if the traction command or the regeneration command of the first rolling stock is detected.

Thus, the dispatcher is informed of power conditions of the first rolling stock and can determine which are the appropriate third rolling stocks which can best contribute to the stabilisation of catenary voltage in the neighbourhood of the first rolling stock.

According to still another aspect, the present invention concerns computer programs which can be directly loadable into a programmable device, comprising instructions or portions of code for implementing the steps of the method according to the invention, when said computer programs are executed on a programmable device.

Since the features and advantages relating to the computer programs are the same as those set out above related to the method and device according to the invention, they will not be repeated here.

The characteristics of the invention will emerge more clearly from a reading of the following description of example embodiments, the said description being produced with reference to the accompanying drawings, among which.

Figure 2:
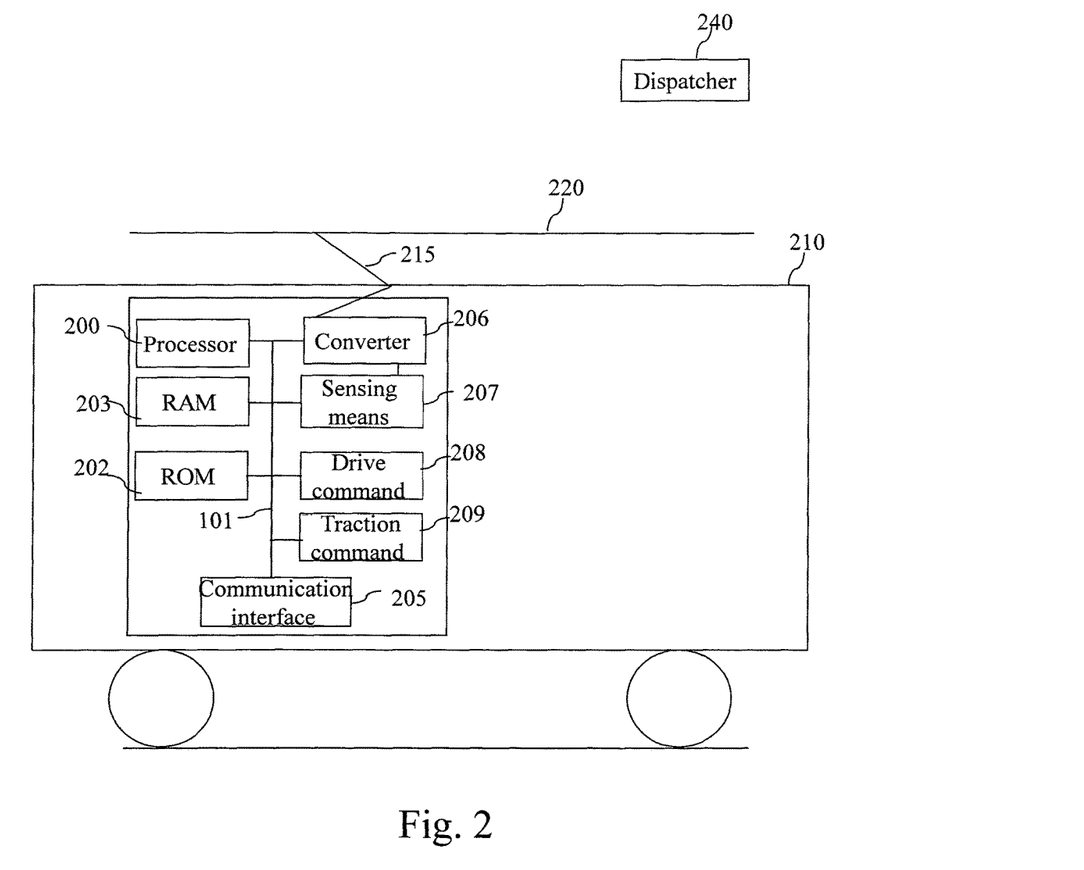
FIG. 2 represents a rolling stock in a system in which the present invention is implemented.

In FIG. 2, a rolling stock 210 is shown. The rolling stock 210 has a pantograph 215 which links the rolling stock 210 to a catenary 220.

According to the second mode of realization of the present invention; the system comprises a dispatcher 240.

The rolling stock 210 comprises a device for controlling the voltage of a catenary supplying electric power to rolling stocks. The device for controlling the voltage of the catenary supplying electric power to rolling stocks has, for example, an architecture based on components connected together by a communication bus 201 and a processor 200 controlled by the programs as disclosed in FIG. 4 or 6.

The communication bus 201 links the processor 200 to a read only memory ROM 202, a random access memory RAM 203, electric power conversion means 206, a traction command module 208 and according to different modes of realization of the present invention, a communication interface 205, catenary voltage sensing means 207 and traction command sensing means 209.

Figure 4:
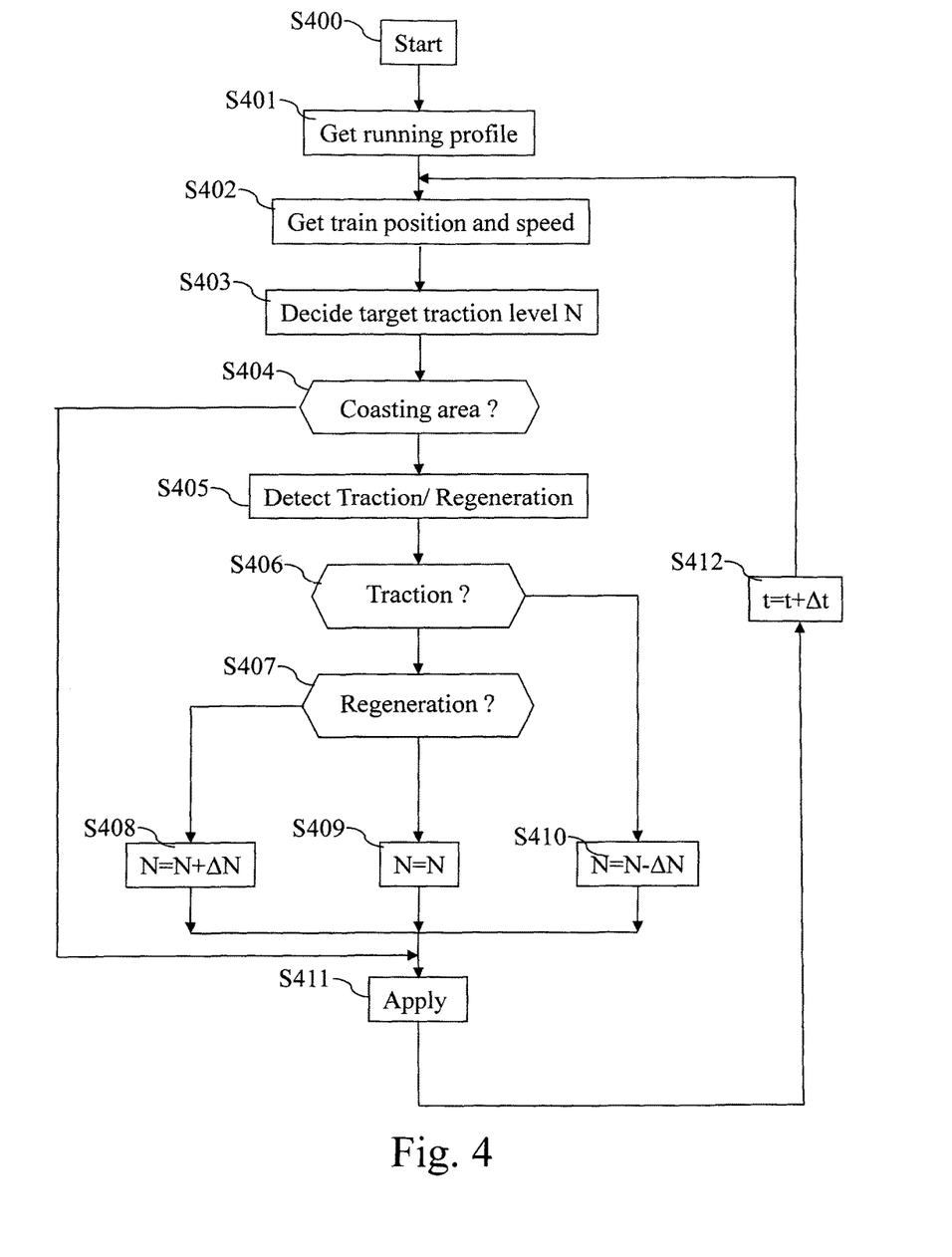
FIG. 4 discloses an algorithm executed by a rolling stock and neighbouring rolling stocks according to a first and second modes of realization of the present invention.
Figure 6:
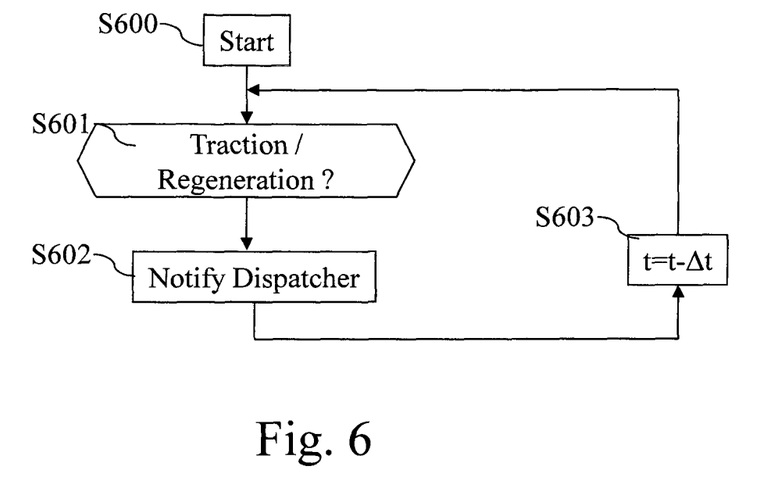
FIG. 6 discloses an algorithm executed by a rolling stock according to a second mode of realization of the present invention.

The memory 203 contains registers intended to receive variables and the instructions of the programs related to the algorithm as disclosed in FIG. 4 or 6.

The read only memory 202 contains instructions of the programs related to the algorithm as disclosed in FIG. 4 or 6, which are transferred, when the device for controlling the voltage of a catenary supplying electric power to rolling stocks is powered on, to the random access memory 203.

The device for controlling the voltage of the catenary supplying electric power to rolling stocks comprises, according to the second mode of realization of the present invention, a communication interface 205. For example, the communication interface 205 is a wireless interface or a communication interface enabling communication through the electric power network.

The device for controlling the voltage of the catenary supplying electric power to rolling stocks comprises, according to the first mode of realization of the present invention, catenary voltage sensing means 207 which may detect voltage variations of the catenary 220, traction command sensing means 209 which may sense modification of traction commands.

Any and all steps of the algorithms described hereafter with regard to FIG. 4 or 6 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the device for controlling the voltage of the catenary supplying electric power to rolling stocks includes circuitry, or a device including circuitry, causing the device for controlling the voltage of a catenary supplying electric power to rolling stocks to perform the steps of the algorithms described hereafter with regard to FIG. 4 or 6.

According to the invention, the device for controlling the voltage of the catenary supplying electric power to rolling stocks comprises:
  means for detecting a traction command or a regeneration command of a second rolling stock in the neighborhood of first rolling stock,
  means for increasing the electric power supplied by the first rolling stock to the motor drive of the first rolling stock when a regeneration command of the second rolling stock is detected,
  means for decreasing the electric power supplied by the first rolling stock to the motor drive of the first rolling stock when a traction command of the second rolling stock is detected.

Figure 3:
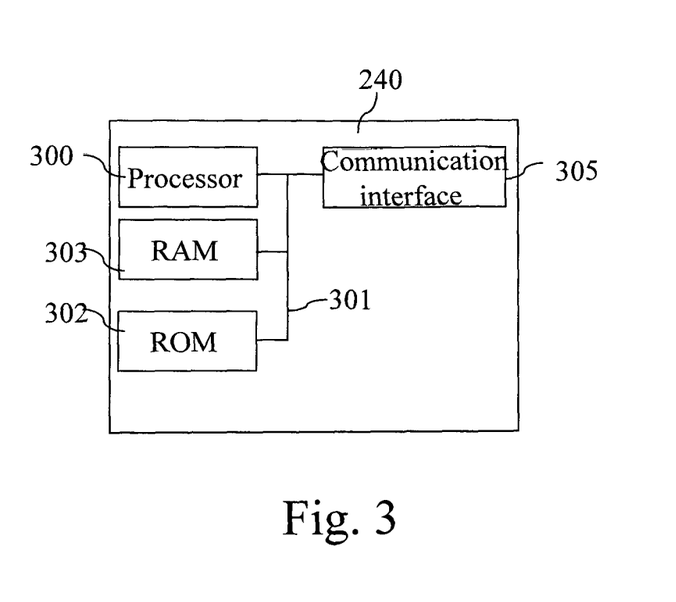
FIG. 3 is a diagram representing the architecture of a dispatcher in which the present invention, according to a second mode of realization, is implemented.

FIG. 3 is a diagram representing the architecture of a dispatcher in which the present invention, according to a second mode of realization, is implemented.

Figure 7:
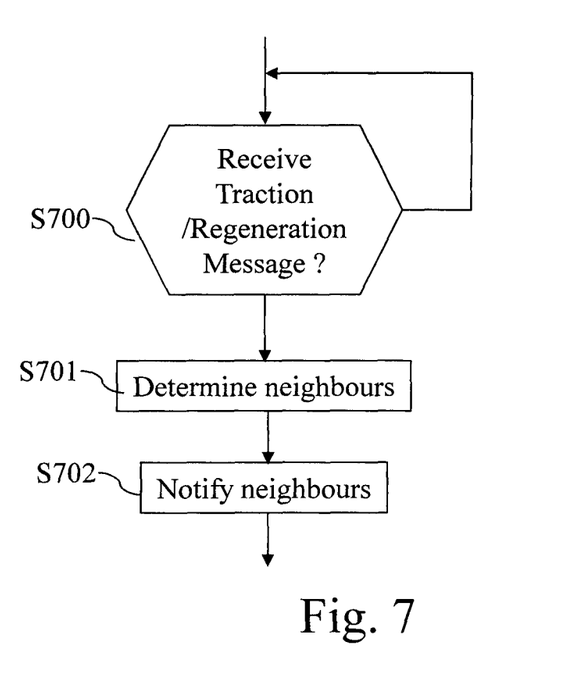
FIG. 7 discloses an algorithm executed by a dispatcher according to the second mode of realization of the present invention.

The dispatcher 240 has, for example, an architecture based on components connected together by a bus 301 and a processor 300 controlled by the program as disclosed in FIG. 7.

The bus 301 links the processor 300 to a read only memory ROM 302, a random access memory RAM 303 and a communication interface 305.

The memory 303 contains registers intended to receive variables and the instructions of the program related to the algorithm as disclosed in FIG. 7.

The processor 300 controls the operation of the communication interface 305.

The read only memory 302 contains instructions of the program related to the algorithm as disclosed in FIG. 7, which are transferred, when the dispatcher 240 is powered on, to the random access memory 303.

The dispatcher 240 is connected to a communication network through the communication interface 305. For example, the communication interface 305 is a wireless interface or a communication interface enabling communication through the electric power network.

Through the network interface 305, the dispatcher 240 may transfer messages and/or receive messages to/from rolling stocks.

Any and all steps of the algorithm described hereafter with regard to FIG. 7 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the dispatcher 240 includes circuitry, or a device including circuitry, causing the dispatcher 240 to perform the steps of the algorithms described hereafter with regard to FIG. 7.

FIG. 4 discloses an algorithm executed by a rolling stock and neighbouring rolling stocks according to first and second modes of realization of the present invention.

More precisely, the present algorithm is executed by the processor 200.

At step S400, the processor 200 starts the present algorithm.

At next step S401, the processor 200 gets the running profile of the rolling stock.

The running profile indicates times, position, speed at which the rolling stock should be if the rolling stock is on time according to a given schedule.

At next step S402, the processor 200 gets the rolling stock position and speed.

At next step S403, the processor 200 decides a target traction power command or a regeneration power command to be set to the rolling stock in order to keep rolling stock on schedule. A traction power command corresponds to a positive traction power level, a regeneration power command corresponds to a negative traction power level.

As example, the processor 200 estimates time and determines from the running profile, the target traction power command or the regeneration power command needed at the estimated time to reach position and speed of running profile at a next time step.

As example, the processor 200 estimates the target traction power command or the regeneration power command as needed to keep schedule in running profile, by an estimate of the needed acceleration or deceleration taking into account the resistance and gravity forces applied to the mass of the rolling stock.

As another example, the target traction power command or the regeneration power command is further determined in order to reduce any delay/advance observed from measured position and speed at step S402.

The processor 200 rounds the target traction power command or the regeneration power command to closest predetermined traction power level N. Predetermined traction power levels are called notches. Positive notches correspond to traction commands, in favour of acceleration of rolling stock, while negative notches correspond to braking commands, in favour of deceleration of the rolling stock. For example they are four positive notches and four negative notches and one null notch which corresponds to coasting mode and null traction power level.

At next step S404, the processor 200 checks if the rolling stock is coasting. The rolling stock is coasting when at step S403, the processor 200 has determined that the target traction command or the regeneration power command is null. If the rolling stock is coasting, the processor 200 moves to step S405. Otherwise, the processor 200 moves to step S411.

At step S405, the processor 200 checks if a neighbour rolling stock applies a traction power command or a regeneration power command mode.

According to a first mode of realization of the invention, the processor 200 determines that a neighbour rolling stock applies a traction power command when the pantograph voltage sensed by sensing means 207 is below a first voltage value $V_1$. When a neighbour rolling stock accelerates, the electric power needed by the motor drive of the neighbour rolling stock increases, causing a decrease of catenary voltage on catenary due to ohmic losses in the catenary.

According to the first mode of realization of the invention, the processor 200 determines that a neighbour rolling stock applies a regeneration power command when pantograph voltage sensed by sensing means 207 is higher than a second voltage value $V_2$. When a neighbour rolling stock decelerates, the electric power fed to the catenary by the motor drive of the neighbour rolling stock increases, causing an increase of catenary voltage due to ohmic losses in the catenary.

According to a second mode of realization of the invention, the processor determines that a neighbour rolling stock applies a traction or a regeneration power command according to a message received by communication interface 205 from the dispatcher 240.

At next step S406, the processor 200 checks if a neighbour rolling stock applies a traction power command.

If a neighbour rolling stock applies a traction power command, the processor 100 moves to step S410. Otherwise, the processor 200 moves to step S407.

At step S407, the processor 200 checks if a neighbour rolling stock applies a regeneration power command.

If a neighbour rolling stock applies a regeneration power command, the processor 200 moves to step S408. Otherwise, the processor 200 moves to step S409.

At step S408, the processor 200 sets the traction power level to be applied by the motor drive of the rolling stock according to the target traction command N determined at step S403 plus some predetermined correction command ΔN. As a typical example, the correction command ΔN is set to a quarter of the notch $N_{max}$ corresponding to the maximum traction power of the rolling stock.

After that, the processor 200 moves to step S411.

At step S409, the processor 200 does not modify the traction power level to be applied by the motor drive of the rolling stock. After that, the processor 200 moves to step S411.

At step S410, the processor 200 sets the traction power level to be applied to by the motor drive of the rolling stock according to the traction command N decided at step S403 minus the predetermined correction command ΔN. After that, the processor 200 moves to step S411.

At step S411, the processor 200 commands the motor drive to apply the traction power level determined in steps S408, S409 or S410.

After that, the processor 200 moves to step S412 and waits for next time step. Time steps are typically spaced with few hundreds of milliseconds.

After that, the processor 200 returns to step S402.

FIG. 5 represent the speed, electric power consumption, and catenary voltage at pantograph of two neighboring rolling stocks in a railway system in which the present invention is implemented;

The curves in bold are related to a first rolling stock A, the other curves are related to a second rolling stock B.

Figure 5A:
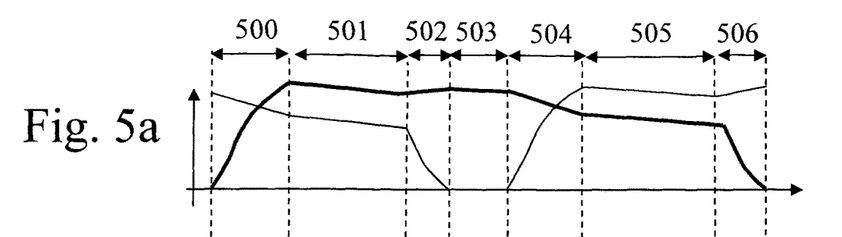
FIG. 5 represent the speed, electric power consumption and catenary voltage at pantograph of two neighboring rolling stocks in a railway system in which the present invention is implemented.

FIG. 5*a* represents the electric power consumption of two neighboring rolling stocks.

The horizontal axis of FIG. 5*a* represents the time.

The vertical axis of FIG. 5*a* represents the speed of rolling stocks.

During the time period noted 500, the first rolling stock A accelerates, the speed of the rolling stock A increases, as the rolling stock A is consuming traction power. During the time period noted 501, the rolling stocks A and B are both in coasting mode, the speeds of the rolling stock A and B decrease.

During the time period noted 502, the second rolling stock B decelerates, the speed of the rolling stock B decreases as the rolling stock B is braking and regenerating power. At that time, the running profile of rolling stock A described in FIG. 1 indicates that the rolling stock A should be in coasting mode. As the rolling stock A detects that the rolling stock B is regenerating power, the rolling stock A increases the electric power provided to its motor drive. As a result, the rolling stock A slowly accelerates, and consumes part of regenerative power injected by the rolling stock B on the catenary.

During the time period noted 503, the second rolling stock B is stopped and the running profile of the rolling stock A described in FIG. 1 indicates that the rolling stock A should be in coasting mode. As rolling stock A no longer detects that the rolling stock B is regenerating power, the first rolling stock A is coasting.

During the time period noted 504, the second rolling stock B accelerates, the speed of the rolling stock B increases. At that time, the running profile of the rolling stock A described in FIG. 1 indicates that the rolling stock A should be in coasting mode. As the rolling stock A detects that the rolling stock B is consuming traction power, the first rolling stock A slowly brakes, and injects some regenerative power to the catenary.

During the time period noted 505, the rolling stocks A and B are in coasting mode, the speed of the rolling stock A and B slowly decreases.

During the time period noted 506, the first rolling stock A decelerates, the speed of the rolling stock A decreases, as the rolling stock A is braking and regenerating power. At that time, the running profile of the rolling stock B described in FIG. 1 indicates that the rolling stock B should be in coasting mode. As the rolling stock B detects that the rolling stock A regenerates electric power, the rolling stock B increases the electric power provided to its motor drive. As a result, the rolling stock B slowly accelerates, and consumes part of the regenerative power injected by the rolling stock A on the catenary.

Figure 5B:
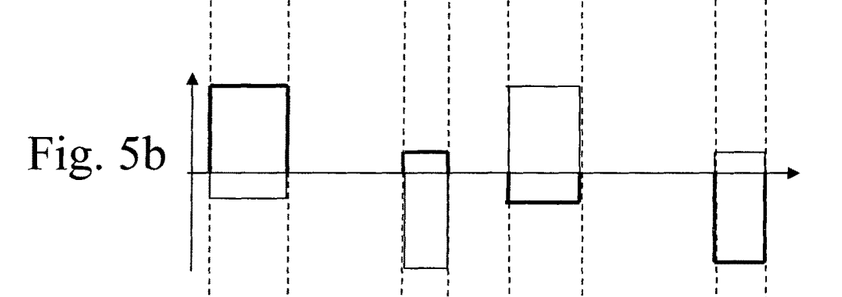

FIG. 5b represents the traction power of two neighboring rolling stocks.

During the time period noted 500, the first rolling stock A accelerates according to its running profile described in FIG. 1, and the traction power of the rolling stock A gets to a large positive value. This is detected by the second rolling stock B which slowly brakes providing small regenerating power. The traction power of the rolling stock B gets negative.

During the time period noted 502, the second rolling stock B decelerates, according to its running profile described in FIG. 1 and the traction power of the rolling stock B gets to a large negative value. This is detected by the first rolling stock A, which slowly accelerates using small traction power. The traction power of the rolling stock B gets positive.

During the time period noted 504, the first rolling stock B accelerates, according to its running profile described in FIG. 1 and the traction power of the rolling stock B gets to a large positive value. This is detected by the second rolling stock A, which slowly brakes providing small regenerating power. The traction power of the rolling stock A gets negative.

During the time period noted 506, the second rolling stock A decelerates, according to its running profile described in FIG. 1 and the traction power of the rolling stock A gets to a large negative value. This is detected by first rolling stock B, which slowly accelerates using small traction power. The traction power of the rolling stock A gets positive.

Figure 5C:
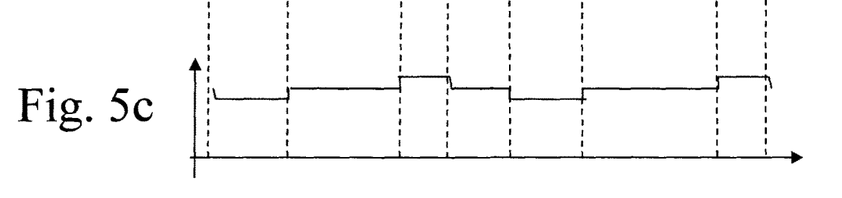

FIG. 5c represents variations of catenary voltage at pantograph of first rolling stock A due to acceleration and electric power regenerating during braking.

The horizontal axis of FIG. 5c represents the time.

The vertical axis of FIG. 5c represents the catenary voltage at pantograph of the first rolling stock A.

In the time period 500, the catenary voltage decreases as the rolling stock A accelerates but less than the time period 100 of FIG. 1c as the rolling stock B slowly decelerates and injects some power to the catenary.

In the time period 501, the catenary voltage is stable as the rolling stocks A and B are coasting.

In the time period 502, the catenary voltage increases as the rolling stock B decelerates but less than the time period 102 of FIG. 1c as the rolling stock A accelerates, and consumes some traction power from the catenary.

According to the first mode of realization of the invention, the rolling stock A detects that the rolling stock B regenerates power because of the increase of the catenary voltage.

As the voltage of catenary is less increased than in time period 102, the amount of regenerated current fed by the rolling stock B to the catenary is increased, and the amount of regenerated current fed by the rolling stock B to its rheostat is decreased. Rheostatic losses in rolling stock B are reduced.

In the time period 503, the catenary voltage is stable as the rolling stock A is coasting and the rolling stock B is stopped.

In the time period 504, the catenary voltage decreases as the rolling stock B accelerates but less than the time period 104 of FIG. 1c as the rolling stock A decelerates and injects some power to the catenary.

According to the first mode of realization of the invention, the rolling stock A detects that the rolling stock B consumes traction power because of the decrease of the catenary voltage. In the time period 505, the catenary voltage is stable as the rolling stocks A and B are coasting.

In the time period 506 the catenary voltage increases as the rolling stock A decelerates but less than the time period 106 of FIG. 1c as the rolling stock B accelerates, and consumes some traction power from the catenary.

As the voltage of catenary is less increased than in time period 103, the amount of regenerated current fed by rolling stock A to the catenary is increased, and the amount of regenerated current fed by rolling stock A to its rheostat is decreased. Rheostatic losses in rolling stock A are reduced.

FIG. 6 discloses an algorithm executed by a rolling stock according to the second mode of realization of the present invention.

More precisely, the present algorithm is executed by the processor 200. At step S600, the processor 200 starts the present algorithm.

At next step S601, the processor 200 detects if a traction or regeneration command is requested for the rolling stock.

If traction or regeneration command is requested for the rolling stock, the processor 200 moves to step S602, else the processor 200 returns to step S601.

The traction or regeneration command may be detected through the catenary voltage sensing means 207 or through the traction command sensing means 209.

At next step S602, the processor 200 sends a message to the dispatcher 240, via the communication interface 205, indicating that a traction or a regeneration command is detected for the rolling stock or for a neighbouring rolling stock. Then the processor 200 returns to step S601.

FIG. 7 discloses an algorithm executed by a dispatcher according to the second mode of realization of the present invention.

More precisely, the present algorithm is executed by the processor 300. At step S700, the processor 300 checks if a message indicating that a traction or a regeneration command, detected for a rolling stock, is received from the communication interface 305.

If a message indicating that a traction or a regeneration command, detected for a rolling stock, is received from the communication interface 305, the processor 300 moves to step S701. Otherwise, the processor 300 returns to step S700.

At step S701, the processor 300 determines the rolling stocks which are neighbour to the rolling stock which sent the received message.

As example, the dispatcher stores in RAM 303 the running profiles of all rolling stocks, indicating positions of all rolling stock over time. At the time of receiving the message at step S700, the position of the emitting rolling stock is determined from the running profile, and compared with position of other rolling stocks.

As a first implementation, rolling stocks are determined to be neighbour when they are supplied by the same catenary sub-segment located between two substations.

As a second implementation, rolling stocks are determined to be neighbour when the distance between rolling stocks is lower than a threshold.

As a third implementation, rolling stocks are determined to be neighbour when they are supplied by the same catenary or when they are located on the same railway line.

At next step S702, the processor 300 commands the transfer of a message to each rolling stock determined as neighbour to the rolling stock which sent the received message notifying the rolling stocks that an acceleration or a deceleration, i.e. a traction or a regeneration is being performed by a rolling stock.

After that, the processor 300 returns to step S700.

Figure 8:
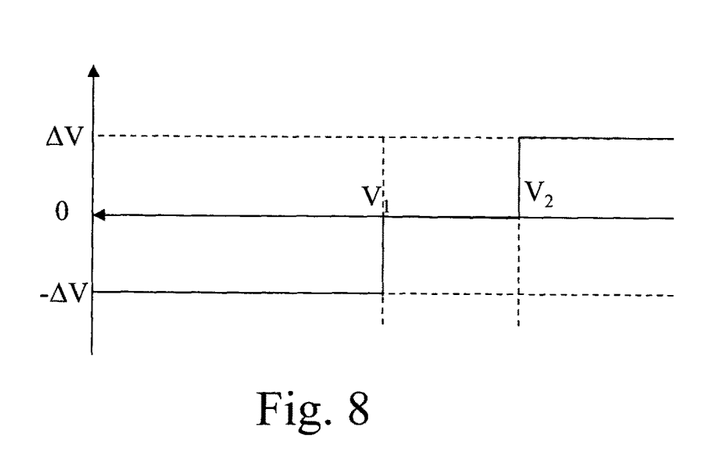
FIG. 8 discloses an example of a curve for determining the electric power to be provided to motor drive of the rolling stock according to voltage catenary.

FIG. 8 discloses an example of a curve for determining the electric power to be provided to motor drive of the rolling stock according to voltage catenary.

The voltage monitored on catenary is on the horizontal axis and the power to be provided to the motor drive is on the vertical axis.

If the voltage monitored on catenary is lower than a voltage $V_1$ which is for example equal to 90% of the nominal voltage provided by the catenary, the traction power level is decreased using a correction command $\Delta N$.

If the voltage monitored on catenary is upper than the voltage $V_2$ the traction power level is decreased using a correction command $-\Delta N$.

If the voltage monitored on catenary is upper than the voltage $V_1$ and lower than a voltage $V_2$ which is for example equal to 110% of the nominal voltage provided by the catenary, the traction power level is maintained to the target traction power level determined at step S402.

Naturally, many modifications can be made to the embodiments of the invention described above without departing from the scope of the present invention.

The invention claimed is:

1. Method for controlling the voltage of a catenary supplying electric power to rolling stocks, each rolling stock comprising a motor drive, characterized in that the method comprises the steps executed by a first rolling stock of:
   detecting a traction command or a regeneration command of a second rolling stock in the neighborhood of first rolling stock,
   increasing the electric power supplied by the first rolling stock to the motor drive of the first rolling stock when a regeneration command of the second rolling stock is detected and if the first rolling stock is in a coasting mode,
   decreasing the electric power supplied by the first rolling stock to the motor drive of the first rolling stock when a traction command of the second rolling stock is detected and if the first rolling stock is in a coasting mode.

2. Method according to claim 1, characterized in that the coasting mode is determined according to a profile of the first rolling stock.

3. Method according to claim 2, characterized in that the method comprises further step of transferring a message to the dispatcher if the traction command or the regeneration command of the first rolling stock is detected.

4. Method according to claim 1, characterized in that the step of detecting a traction command or a regeneration command further comprises steps of
   monitoring the voltage on the catenary,
   detecting a traction command when the monitored voltage is lower than a first threshold,
   detecting a regeneration command when the monitored voltage is higher than a second threshold.

5. Method according to claim 1, characterized in that the traction command or the regeneration command is detected by receiving a message from a dispatcher.

6. Method according to claim 5, characterized in that the method comprises further step of transferring a message to the dispatcher if the traction command or the regeneration command of the first rolling stock is detected.

7. Method according to claim 1, characterized in that the method comprises further step of transferring a message to the dispatcher if the traction command or the regeneration command of the first rolling stock is detected.

8. Device for controlling the voltage of a catenary supplying electric power to rolling stocks, each rolling stock comprising a motor drive characterized in that the device is included in a first rolling stock and comprises:
   a processor to execute a program; and
   a memory to store the program which, when executed by the processor, performs processes of,
   detecting a traction command or a regeneration command of a second rolling stock in the neighborhood of first rolling stock,
   increasing the electric power supplied by the first rolling stock to the motor drive of the first rolling stock when a regeneration command of the second rolling stock is detected and if the first rolling stock is in a coasting mode,
   decreasing the electric power supplied by the first rolling stock to the motor drive of the first rolling stock when a traction command of the second rolling stock is detected and if the first rolling stock is in a coasting mode.

* * * * *